(12) United States Patent
Challener et al.

(10) Patent No.: US 7,013,384 B2
(45) Date of Patent: Mar. 14, 2006

(54) COMPUTER SYSTEM WITH SELECTIVELY AVAILABLE IMMUTABLE BOOT BLOCK CODE

(75) Inventors: David Carroll Challener, Raleigh, NC (US); Steven Dale Goodman, Raleigh, NC (US); Kevin Michael Reinberg, Durham, NC (US); Randall Scott Springfield, Chapel Hill, NC (US); James Peter Ward, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 599 days.

(21) Appl. No.: 10/047,219

(22) Filed: Jan. 15, 2002

(65) Prior Publication Data

US 2003/0135727 A1    Jul. 17, 2003

(51) Int. Cl.
    *G06F 9/24* (2006.01)
(52) U.S. Cl. ............................ 713/2; 713/164; 713/201
(58) Field of Classification Search ............... None
    See application file for complete search history.

(56) References Cited

U.S. PATENT DOCUMENTS

| | | | | |
|---|---|---|---|---|
| 5,379,342 | A | * | 1/1995 | Arnold et al. ................. 713/2 |
| 5,410,699 | A | * | 4/1995 | Bealkowski et al. ........... 713/2 |
| 6,092,160 | A | | 7/2000 | Marsters |
| 6,101,601 | A | | 8/2000 | Matthews et al. |
| 6,115,815 | A | | 9/2000 | Doragh et al. |
| 6,141,730 | A | * | 10/2000 | Nishiumi et al. ........... 711/115 |
| 6,154,819 | A | | 11/2000 | Larsen et al. |
| 6,160,734 | A | | 12/2000 | Henderson et al. |
| 6,178,503 | B1 | | 1/2001 | Madden et al. |
| 6,185,678 | B1 | | 2/2001 | Arbaugh et al. |
| 6,188,602 | B1 | | 2/2001 | Alexander et al. |
| 6,195,749 | B1 | | 2/2001 | Gulick |
| 6,212,555 | B1 | * | 4/2001 | Brooks et al. ............... 709/219 |
| 6,216,225 | B1 | | 4/2001 | Yoo |

(Continued)

FOREIGN PATENT DOCUMENTS

EP    689136 A    12/1995

OTHER PUBLICATIONS

Trusted Computing Platform Alliance, Main Specification Version 1.1, 2000.*

(Continued)

*Primary Examiner*—Lynne H. Browne
*Assistant Examiner*—Anand B. Patel
(74) *Attorney, Agent, or Firm*—Carlos Munoz-Bustamante; Dillon & Yudell LLP

(57) ABSTRACT

A computer system contains selectively available boot block codes. A first boot block is of the conventional type and is stored in storage media such as flash ROM on a system planar with the processor of the computer system. A second boot block is located on a feature card and contains an immutable security code in compliance with the Trusted Computing Platform Alliance (TCPA) specification. The boot block on the feature card is enabled if the first boot block detects the presence of the feature card. The computer system can be readily modified as the computer system is reconfigured, while maintaining compliance with the TCPA specification. A switching mechanism controls which of the boot blocks is to be activated. The feature card is disabled in the event of a computer system reset to prevent access to the TCPA compliant code and function.

15 Claims, 5 Drawing Sheets

U.S. PATENT DOCUMENTS

| | | |
|---|---|---|
| 6,223,284 B1 | 4/2001 | Novoa et al. |
| 6,237,091 B1 | 5/2001 | Firooz et al. |
| 6,415,351 B1 * | 7/2002 | Kobayashi et al. ......... 711/103 |
| 6,763,458 B1 * | 7/2004 | Watanabe et al. ........... 713/100 |

OTHER PUBLICATIONS

"Trusted Computing Platform Alliance (TCPA) Main Specification Version 1.1", Jul. 31, 2001.

* cited by examiner

COMPUTER SYSTEM WITH SELECTIVELY AVAILABLE IMMUTABLE BOOT BLOCK CODE

BACKGROUND OF THE INVENTION

1. Technical Field

The present invention relates to data processing systems, and more particular to computer systems and security in such systems which are in compliance with the Trusted Computing Platform Alliance (or TCPA) specification.

2. Description of the Related Art

The Trusted Computing Platform Alliance (TCPA) is a group of computer industry companies formed with a goal of developing hardware and operating system security capabilities. A computing system or platform, such as a personal computer, is provided with built-in security mechanisms so that the PC and computer system and its peripheral devices are kept secure with minimal reliance on a user or administrator. The TCPA published an approved specification, entitled Main Specification, Version 1.1, in July, 2001, which sets forth definitions of subsystem functions for increased trust and security in computing platforms or systems.

The TCPA specification requires the system to measure the POST/BIOS code for the computer system prior to execution of the code. This requires some amount of trusted and protected code to run at initial power on to measure the remaining POST/BIOS code. This trusted code is referred to as the Core Root of Trust for Measurement (or CRTM) and is usually implemented in a bootblock segment of flash ROM in the computer system.

Special precautions must be taken to protect this function and thus to ensure the integrity of the measurement. These precautions usually render field update of the bootblock segment difficult or impossible without replacing the system planar.

Thus, it would be advantageous to implement the TCPA function for a computer system as an add-in feature card. If the TCPA function and protection mechanisms are included in the base system of the personal computer, systems without TCPA functions must endure the penalties of protecting the CRTM. Specifically, the TCPA requirements for protecting the CRTM prevent updating the boot block to accommodate additions or modifications to the base system.

It would be desirable to provide a computer system which is compliant with the TCPA specification as a part of a feature card, and to ensure POST/BIOS execution from the feature card while the TCPA function is enabled. It would also be desirable to permit enabling of TCPA compliant functions by replacing a TCPA feature card rather than an entire system planar.

SUMMARY OF THE INVENTION

It is therefore an object of the invention to provide a computer system and method having power on self-test/basic input-output (POST/BIOS) compliant with the Trusted Computing Platform Alliance (TCPA) specification without replacing the system planar of the computer system.

It is another object of the invention to provide a computer system and method with selectively available POST/BIOS execution, one compliant with the Trusted Computing Platform Alliance (TCPA) specification, and the other a conventional POST/BIOS.

It is another object of the invention to provide a computer system which has POST/BIOS compliant with the Trusted Computing Platform Alliance (TCPA) specification and also a conventional POST/BIOS and provides protection for the TCPA compliant feature in the event of a reset of the computer system.

It is still another object of the invention to provide a computer system for field upgrades of the TCPA function by replacing a feature card rather than the system planar of the computer system.

The above and other objects are achieved as is now described. A computer system is provided having a processor, an input device for receiving input from a user, a display device for providing visual output to the user, and a system bus connecting the processor to the display device and the input device. The computer system also includes machine readable storage media coupled to the system bus for storing programs performable by the processor, including a boot block for loading an operating system for the computer system. The computer system also includes a feature card with memory storage media for a second boot block for loading an operating system for the computer. The second boot block includes a TCPA compliant security code. If the first boot block detects the presence of the feature card, the boot block on the feature card is enabled. The computer system begins execution again using the TCPA compliant code resident in the second boot block, located on the feature card.

The present invention thus provides a TCPA compliant POST/BIOS on a feature card and ensures POST/BIOS execution from the feature card if the TCPA function is enabled. An additional benefit of this approach is that field upgrade of the TCPA function is possible by replacing the TCPA feature card rather than the entire system planar.

The foregoing and other objects and advantages of the present invention will be apparent to those skilled in the art, in view of the following detailed description of the preferred embodiment of the present invention, taken in conjunction with the appended claims and the accompanying drawings.

DETAILED DESCRIPTION OF THE PREFERRED EMBODIMENT

Figure 1:
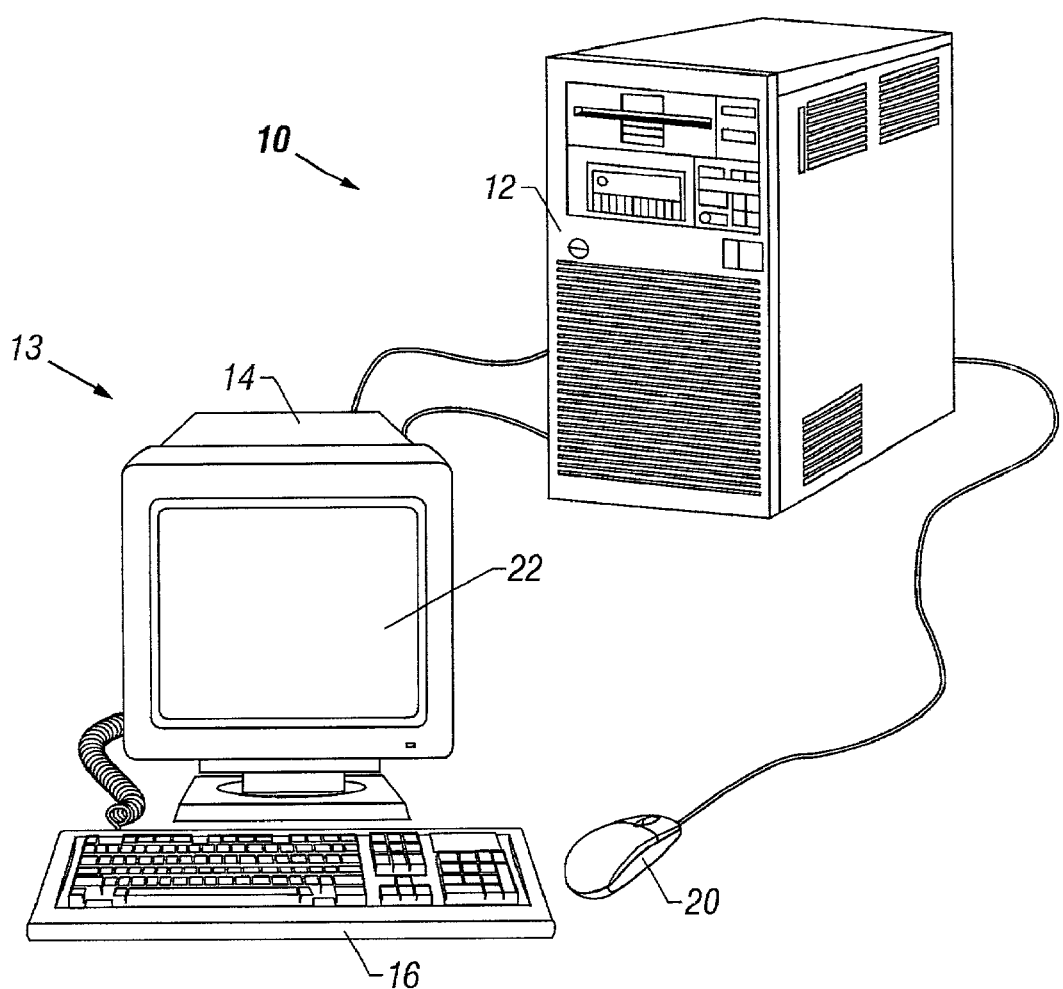
FIG. 1 is an isometric view of a personal computer system in which a preferred embodiment of the present invention may be implemented.

With reference now to the figures and in particular with reference to FIG. 1, there is depicted a pictorial representation of a data processing system 10 with which the present invention may advantageously be utilized. As illustrated, data processing system 10 comprises a workstation 12 to which one or more nodes 13 are connected. The workstation 12 is typically one of a set connected together in a suitable network, such as a local area network or LAN, wide area network or WAN or other computer form of computer network or information interchange medium. Workstation 12 preferably comprises a personal computer, such as a NetVista PC, available from International Business Machines Corporation (IBM). Workstation 12 preferably includes nonvolatile and volatile internal storage for storing software applications.

As depicted, nodes 13 are comprised of a wide variety of types display device 14, a keyboard 16, and a mouse 20. Any suitable software applications may be stored and executed within workstation 12 preferably including software to display a graphic user interface (GUI) within display screen 22 of display device 14 with which a computer user/operator can interact using a keyboard 16 and mouse 20. Thus, by entering appropriate inputs utilizing keyboard 16 and mouse 20, the computer user may perform any work which the software applications are capable of implementing.

Figure 2:
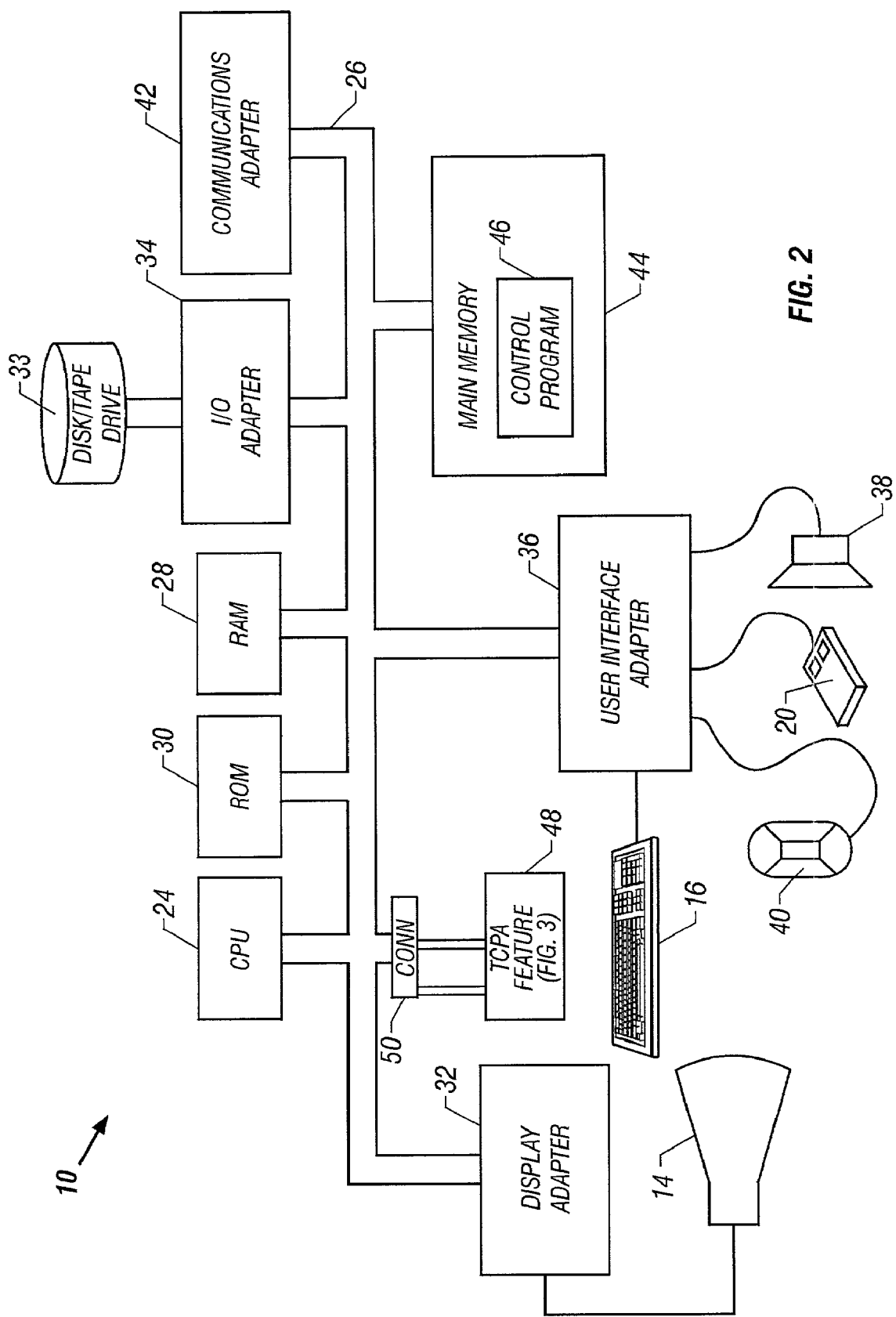
FIG. 2 is a schematic diagram of a representative hardware environment of the personal computer system of FIG. 1.

FIG. 2 depicts a representative hardware environment of data processing system 10 illustrated in FIG. 1. In the drawings, like parts are identified by like numbers. Data processing system 10 in FIG. 2 is thus a configuration that includes all functional components of a computer and its associated hardware. Data processing system 10 includes a Central Processing Unit ("CPU") 24, such as a conventional microprocessor, and a number of other units interconnected in the conventional manner via a system bus 26 on a common board or system planar, also known as a motherboard. CPU 24 includes a portion of data processing system 10 that controls the operation of the entire computer system, including executing the arithmetical and logical functions contained in a particular computer program.

Although not depicted in FIG. 2, CPUs such as CPU 24 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of data processing system 10 can be implemented in a system unit such as workstation 12 of FIG. 1.

Data processing system 10 further includes random-access memory (RAM) 28, read-only memory (ROM) 30, display adapter 32 for connecting system bus 26 to display device 14, and I/O adapter 34 for connecting peripheral devices (e.g., disk and tape drives 33) to system bus 26. RAM 28 is a type of memory designed such that the location of data stored in it is independent of the content. Also, any location in RAM 28 can be accessed directly without having to work through from the beginning. ROM 30 is a type of memory that retains information permanently and in which the stored information cannot be altered by a program or normal operation of a computer.

As is conventional, the ROM 30 is a flash ROM and also contains a boot block or program 31 (FIG. 4) stored therein beginning at a fixed, specific address in memory. The boot block 31 is conventional and is contained as part of the power-on/self test (or POST) and the basic input/output system (or BIOS) for the computer system 10. The bootblock 31 stored in the POST/BIOS begins the process of initializing the computer system 10 and loading an operating system for the CPU 24.

Display device 14 is the visual output of data processing system 10. Display device 14 can be a cathode-ray tube (CRT) based video display well-known in the art of computer hardware. However, with a portable or notebook-based computer, display device 14 can be replaced with a liquid crystal display (LCD) based or gas plasma-based flat-panel display.

Data processing system 10 further includes user interface adapter 36 for connecting keyboard 16, mouse 20, speaker 38, microphone 40, and/or other user interface devices, such as a touch-screen device (not shown), to the system bus 26. Speaker 38 is one type of audio device that may be utilized in association with the method and system provided herein to assist diagnosticians or computer users in analyzing data processing system 10 for system failures, errors, and discrepancies. Communications adapter 42 connects data processing system 10 to a computer network.

Although data processing system 10 is shown to contain only a single CPU and a single system bus, it should be understood that the present invention applies equally to computer systems that have multiple CPUs and to computer systems that have multiple buses that each perform different functions in different ways.

Data processing system 10 also includes an interface that resides within a machine-readable media to direct the operation of data processing system 10. Any suitable machine-readable media may retain the interface, such as RAM 28, ROM 30, a magnetic disk, magnetic tape, or optical disk (the last three being located in disk and tape drives 33). Any suitable operating system and associated interface (e.g., Microsoft Windows) may direct CPU 24. Other technologies also can be utilized in conjunction with CPU 24, such as touch-screen technology or human voice control.

Those skilled in the art will appreciate that the hardware depicted in FIG. 2 may vary for specific design and simulation applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 44 is connected to system bus 26, and includes a control program 46. Control program 46 resides within main memory 44, and contains instructions that, when executed on CPU 24, carries out the operations depicted and described herein.

Typical flash ROM devices such as ROM 30 used to hold the POST/BIOS code 31 include an input 30a (FIG. 4) to permit the flash ROM device 30 on receipt of an appropriate input transition, signal or level to be selected or placed at some base address to permit multiple devices in the system. It is this characteristic that can be used with the present invention to implement a method of switching the boot flash ROM when a feature card (such as a TCPA security feature, as will be set forth below) is installed in the computer system 10.

Figure 3:
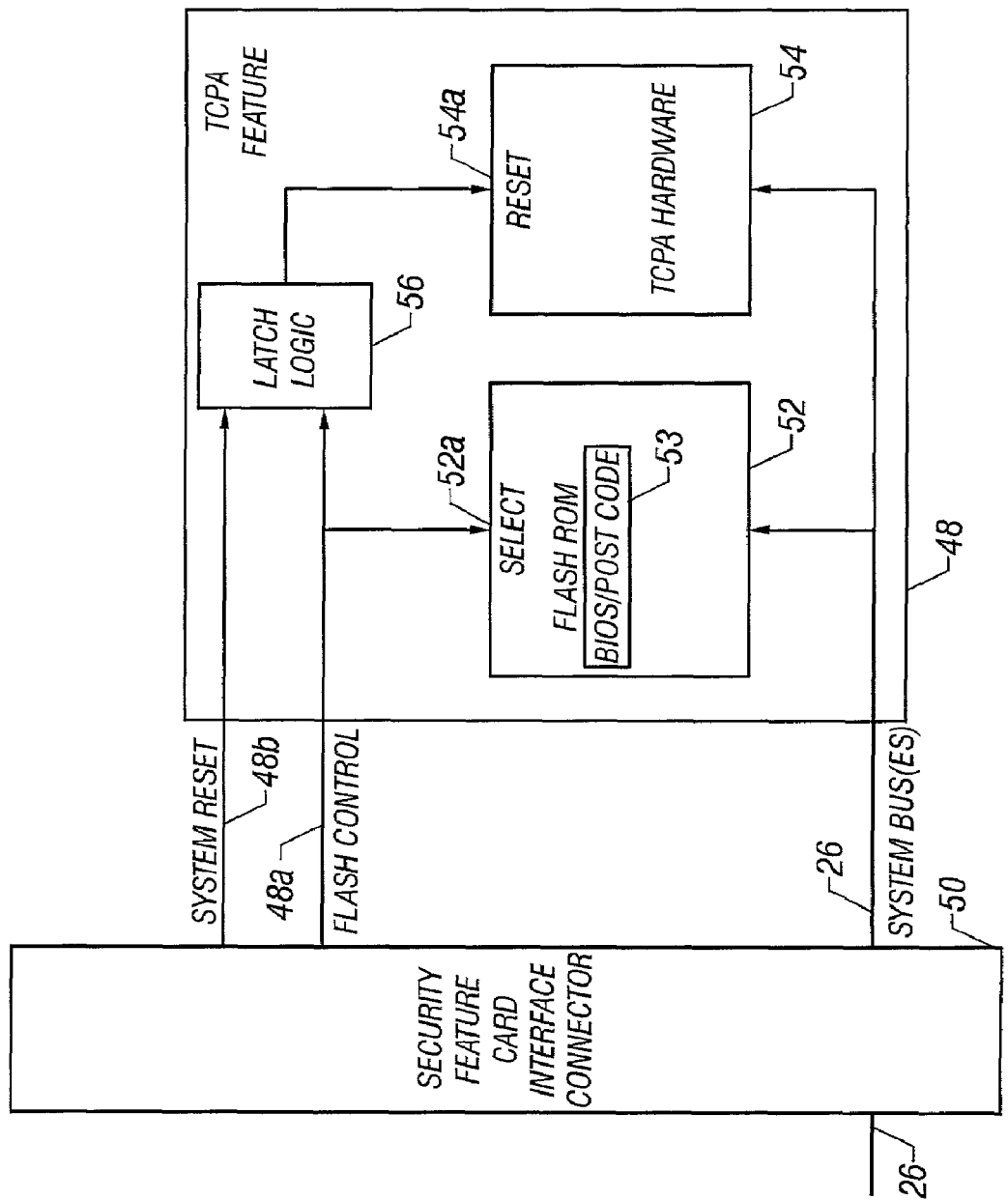
FIG. 3 is a schematic diagram of a TCPA feature card and interfaces with it in the personal computer system of FIG. 2.

Referring now to FIG. 3, the feature card is a TCPA feature card 48 according to the present invention. The TCPA feature card 48 is provided as an additional card or element separate from the system planar for other components shown in FIG. 2 as connected directly to the system bus 26. The TCPA feature card 48 (FIG. 3) is connected through a security card interface connector 50 to the system bus 26,. The feature card 48 includes a memory storage device in the form of a flash ROM 52, TCPA compliant hardware 54 to provide support for compliance with the TCPA specification and a latch logic module 56. The components of the TCPA compliant hardware 54 are configured in compliance with the above-referenced TCPA Main Specification 1.1, which is incorporated herein by reference, and are thus conventional.

The flash ROM 52 and the TCPA compliant hardware 54 of the TCPA feature card 48 are connected to appropriate buses, such as system bus 26, by the security card interface connector 50. Depending on the configuration of the computer system, the flash ROM 52 and TCPA compliant hardware 54 may be connected to other appropriate system buses. For example, the flash ROM 52 and TCPA compliant hardware 54 may be connected to a local memory bus, an LPC bus, an ISA bus or the like with a suitable connector.

The flash ROM 52 (FIG. 3) of the TCPA feature card 48 contains a power-on/self test (or POST) and a basic input/output system or BIOS) for the computer system 10, including a boot block or program 53 stored therein beginning at a fixed, specific address in memory. In addition, the boot block 53 (FIG. 3) contains a suitable amount of trusted and protected code in accordance with the TCPA specification for the Core Root of Trust Measurement (or CRTM). The CRTM code is one which runs at initial power on to measure the remaining POST/BIOS code in the flash ROM 52. The flash ROM 52 also contains a select input 52a (FIG. 3) to permit flash ROM 52, on receipt of an appropriate input, to be selected or placed at some base address in a like manner to flash ROM 30. The POST/BIOS stored in the bootblock 53 is enabled in a manner to be set forth below on verification by the TCPA hardware 54 that compliance with the TCPA specification is achieved. The bootblock 53 when so enabled begins the process of initializing the computer system 10 and loading an operating system for the CPU 24.

The TCPA feature card 48 (FIG. 3) also has inputs 48a and 48b for a flash control signal and a system reset, respectively. The flash control at input 48a is received from GPIO 36 (FIG. 4) over conductor 58 from the system planar P. The flash control signal from GPIO 36 is also furnished to a select input of the ROM 30 on the system planar P. The connector 50 also provides a system reset from the POST/BIOS on the system planar P to the latch logic 56 on the TCPA feature card 48. The latch logic 56 provides in turn an input to a reset terminal 54a of the TCPA hardware 54.

The flash control signal formed in GPIO 36 is used to indicate whether flash ROM 30 on the system planar P or flash ROM 52 on the TCPA feature card is to be used as the source of the POST/BIOS code when power on of the computer system begins. If the flash control indicates the feature card flash ROM 52 is selected, the reset is passed to the TCPA hardware 54 normally, thereby permitting normal operation of the hardware. If the flash control indicates the planar flash ROM 30 is being used, the latch logic 56 latches and holds or blocks the reset to the TCPA hardware 54, thereby preventing the operation of the hardware 54.

Figure 4:
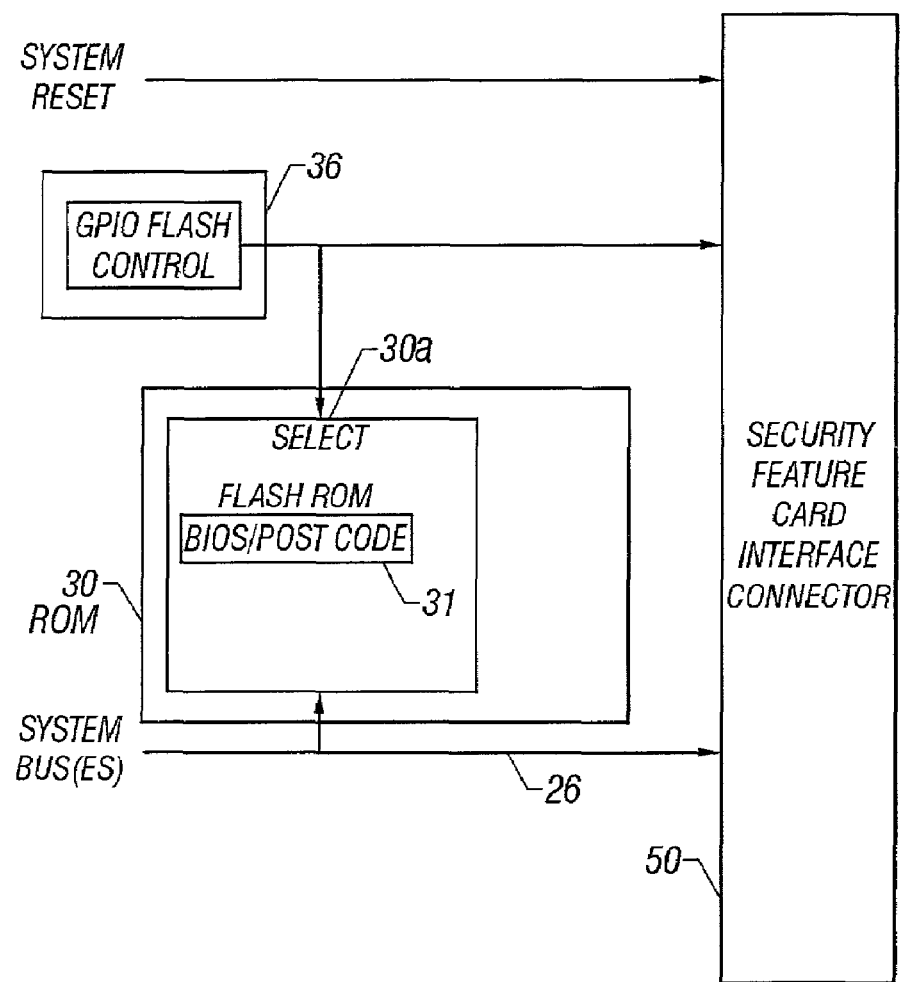
FIG. 4 is a schematic diagram of interface portions of the personal computer system of FIG. 2 with the TCPA feature card of FIGS. 2 and 3.

Now referring to FIG. 4, portions of the system planar P shown in FIG. 2 are shown in more detail. The interface adapter 36 provides a flash control output and the planar POST/BIOS code 31 provides a system reset signal to the feature card connector 50, as has been set forth. Additionally, the flash control is connected to the select input 30a of the planar flash ROM device 30. The flash control GPIO of interface adapter 36 is protected so that it is not affected by system reset. Specifically, the system planar must maintain the state of the GPIO from interface adapter 36 across a system reset.

An additional useful, but not required, optional characteristic provided with the present invention is the flash control GPIO from interface adapter 36 should retain its state unless AC power is lost from the data processing system 10. Upon power on, as indicated schematically at 60 in the flow chart of FIG. 5, if the planar flash control indicates at step 62 that the system 10 should begin POST/BIOS execution from the planar flash ROM 30, the TCPA function has been is disabled, in the manner previously described. The POST/BIOS operation continues, using the planar POST/BIOS, as shown at 64 in the flow chart of FIG. 5.

Figure 5:
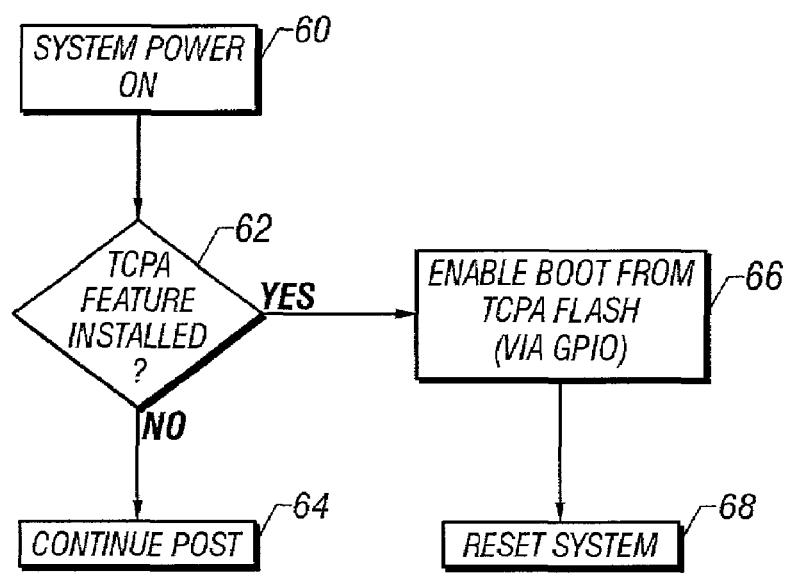
FIG. 5 is a flow chart indicating the processing of power-on self test or POST requests according to the present invention.

If during step 62 the planar POST/BIOS 31 indicates the feature card 48 is installed, the planar POST/BIOS code 31, as indicated at 66 in FIG. 5, sets the state of the flash control 36 to indicate the TCPA feature flash ROM 52 should be used. The planar POST/BIOS issues a system reset, as shown at 68 in FIG. 5. This causes the system 10 to begin POST/BIOS execution again, but from the POST/BIOS 53 of the flash ROM 52 of TCPA feature card 48 instead of the POST/BIOS 31 of planar flash ROM 30.

Figure 6:
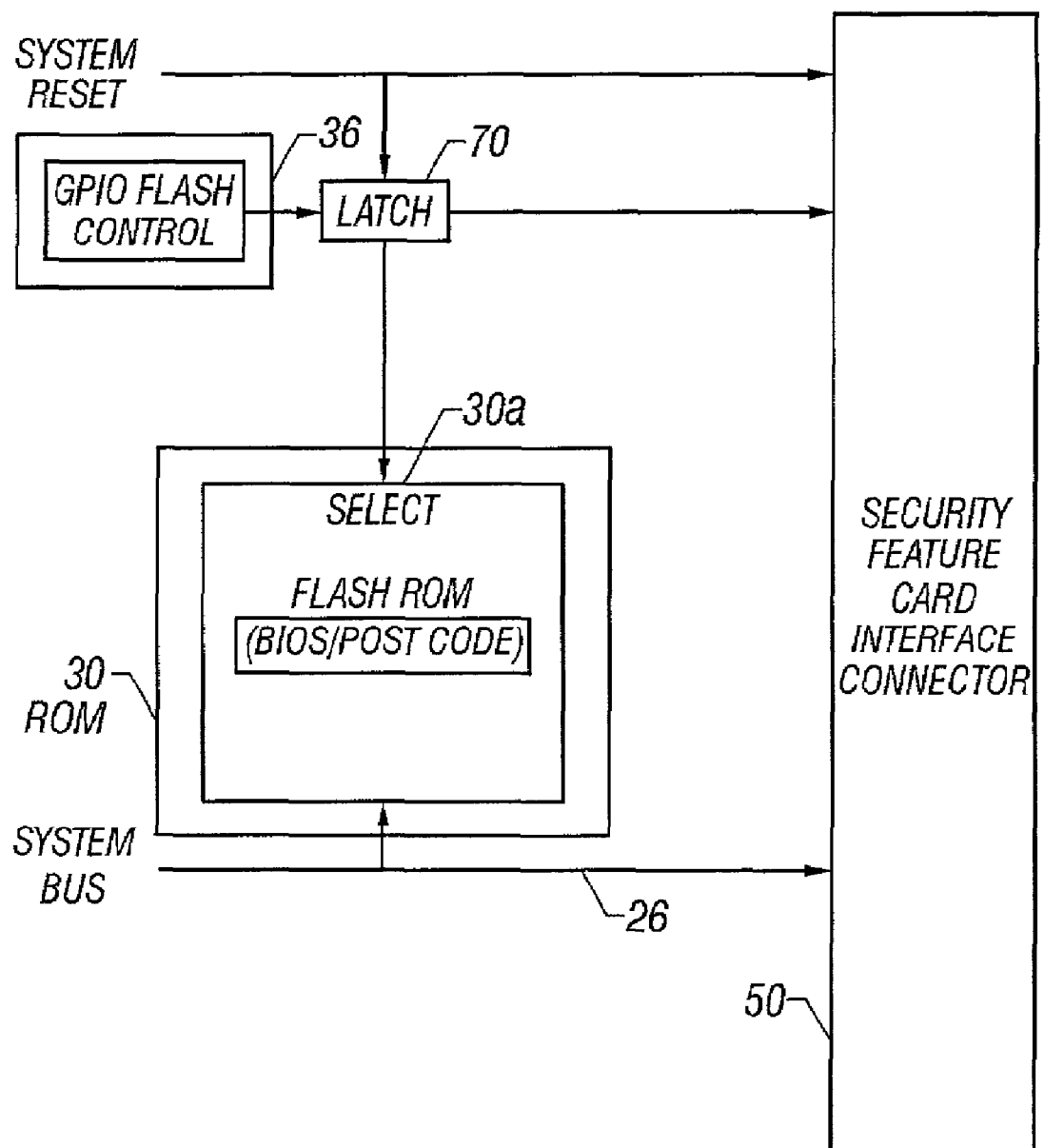
FIG. 6 is a schematic diagram of an alternative form of is a schematic diagram of interface portions of the personal computer system of FIG. 2 with the TCPA feature card of FIGS. 2 and 3.

If the flash ROM devices 30 and 52 are of a type which do not latch the select input upon reset, the planar flash ROM 30 and the feature card flash ROM 52 must include identical checking/switching functions at identical addresses. If this is not feasible, an additional latch 70 may be necessary on the planar P, as shown in FIG. 6. The latch 70 then provides such a latching capability for the select inputs of the planar flash ROM 30 and the feature card flash ROM 52 on reset.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

While the invention has been shown or described in only some of its forms, it should be apparent to those skilled in the art that it is not so limited, but is susceptible to various changes without departing from the scope of the invention.

What is claimed is:

1. A computer system comprising:
   a processor;
   input means for receiving input from a user;
   a display device for providing visual output from the operating system to the user;
   a system bus connecting the processor to the display device and the input means;
   machine readable storage media coupled to the system bus for storing programs performable by the processor, including a boot block for loading an operating system for the computer system; and
   a feature card with memory storage media for a second boot block for loading an operating system for the computer and security code within said memory storage media for measuring security compliance of the second boot block when enabled wherein compliance with the Trusted Computing Platform Alliance specification is provided by said feature card.

2. The computer system of claim 1, further including:
   a connector for connecting the feature card to the system bus.

3. The computer system of claim 1, further including:
   a switch mechanism for indicating which of the boot blocks is to load an operating system for the computer system.

4. The computer system of claim 2, wherein the switch mechanism includes a control switch.

5. The computer system of claim 3, wherein the control switch activates the second boot block when the feature card is enabled.

6. The computer system of claim 3, wherein the control switch activates the boot block in the machine readable storage media when the feature card is disabled.

7. The computer system of claim 2, wherein the computer system is susceptible to a system reset, and the feature card includes logic responsive to the switch mechanism for inhibiting operation of the feature card if the boot block in the machine readable storage media is enabled.

8. The computer system of claim 2, further including a latch mechanism for storing the output of the switch mechanism indicating which of the boot blocks is to load an operating system for the computer system.

9. A computer system comprising:
   a processor located on a system planar;
   input means for receiving input from a user;
   a display device for providing visual output from the software applications to the user;
   a system bus connecting the processor to the display device and the input means;
   machine readable storage media located on the system planar with the processor and coupled to the system bus for storing programs performable by the processor;
   an interface adapter for transferring input from the user at the input means to the system bus;
   a feature card separate from the system planar and provided with memory storage media for storing a second boot block for loading an operating system for the computer, and for storing security code for measuring security compliance of the second boot block when enabled; wherein compliance with the Trusted Computing Platform Alliance specification is provided by said feature card; and
   a connector for connecting the feature card to the system bus.

10. The computer system of claim 9, further including:
    a switch mechanism for indicating which of the boot blocks is to load an operating system for the computer system.

11. The computer system of claim 10, wherein the switch mechanism includes a control switch.

12. The computer system of claim 11, wherein the control switch activates the second boot block when the feature card is enabled.

13. The computer system of claim 11, wherein the control switch activates the boot block in the machine readable storage media when the feature card is disabled.

14. The computer system of claim 9, wherein the computer system is susceptible to a system reset and the feature card includes logic responsive to the switch mechanism for inhibiting operation of the feature card if the boot block in the machine readable storage media is enabled.

15. The computer system of claim 9, further including a latch mechanism for storing the output of the switch mechanism indicating which of the boot blocks is to load an operating system for the computer system.

* * * * *